United States Patent
Daft et al.

(10) Patent No.: US 7,087,023 B2
(45) Date of Patent: Aug. 8, 2006

(54) MICROFABRICATED ULTRASONIC TRANSDUCERS WITH BIAS POLARITY BEAM PROFILE CONTROL AND METHOD OF OPERATING THE SAME

(75) Inventors: Christopher M. W. Daft, Pleasanton, CA (US); Paul A. Wagner, Berkeley, CA (US); Igal Ladabaum, San Carlos, CA (US)

(73) Assignee: Sensant Corporation, San Leandro, CA (US)

( * ) Notice: Subject to any disclaimer, the term of this patent is extended or adjusted under 35 U.S.C. 154(b) by 67 days.

(21) Appl. No.: 10/367,106

(22) Filed: Feb. 14, 2003

(65) Prior Publication Data

US 2004/0160144 A1    Aug. 19, 2004

(51) Int. Cl.
    *A61B 8/14*    (2006.01)
(52) U.S. Cl. .................................... 600/459
(58) Field of Classification Search ............. 310/334, 310/344, 364, 317–18, 309, 336, 363, 365, 310/367; 367/155, 157, 103; 318/116; 381/191; 600/459
See application file for complete search history.

(56) References Cited

U.S. PATENT DOCUMENTS

| | | | |
|---|---|---|---|
| 4,670,683 A | 6/1987 | t'Hoen | 310/335 |
| 4,736,630 A | 4/1988 | Takahashi et al. | |
| 4,888,746 A | 12/1989 | Wurster et al. | |
| 5,301,168 A | 4/1994 | Miller | 367/138 |
| 5,415,175 A | 5/1995 | Hanafy et al. | 600/457 |
| 5,490,512 A | 2/1996 | Kwon et al. | |
| 5,619,476 A | 4/1997 | Haller et al. | 367/181 |
| 5,627,580 A * | 5/1997 | Nelson | 347/239 |
| 5,651,365 A | 7/1997 | Hanafy et al. | 600/459 |
| 5,671,746 A | 9/1997 | Dreschel et al. | |
| 5,768,007 A * | 6/1998 | Knipe et al. | 359/290 |
| 5,894,452 A | 4/1999 | Ladabaum et al. | 367/163 |
| 5,982,709 A | 11/1999 | Ladabaum | 367/170 |
| 6,172,797 B1 * | 1/2001 | Huibers | 359/291 |
| 6,246,158 B1 * | 6/2001 | Ladabaum | 310/334 |
| 6,271,620 B1 * | 8/2001 | Ladabaum | 310/334 |
| 6,328,697 B1 * | 12/2001 | Fraser | 600/459 |
| 6,381,197 B1 | 4/2002 | Savord et al. | |
| 6,562,650 B1 * | 5/2003 | Ladabaum | 438/53 |
| 6,571,445 B1 * | 6/2003 | Ladabaum | 29/25.35 |

FOREIGN PATENT DOCUMENTS

EP    0 978 822 A2    2/2000

OTHER PUBLICATIONS

ISR PCT/US2004/002740 Mailed Jul. 7, 2004.

\* cited by examiner

*Primary Examiner*—Francis J. Jaworski

(57) ABSTRACT

A capacitive microfabricated ultrasonic transducer with control of elevation phase through alternating bias polarity is disclosed. Such control of elevation phase results in simple ultrasonic probes with excellent slice thickness attributes. Furthermore, tight spatial variation of phase results in an effective way to achieve transmit aperture and apodization control. Further still, such capacitive microfabricated ultrasonic transducers can achieve elevation focus without the need of a lossy mechanical lens.

47 Claims, 12 Drawing Sheets

15 mm focus: +-+-+-+-+-+-+-+-+-+-++++++++++++++++++++++++++++++-+-+-+-+-+

50 mm focus: -+-+-+++++++++++++++++++++++++++++++++++-+-+-+-+-----

← Elevation direction

FIG. 8

MICROFABRICATED ULTRASONIC TRANSDUCERS WITH BIAS POLARITY BEAM PROFILE CONTROL AND METHOD OF OPERATING THE SAME

FIELD OF THE INVENTION

The present invention generally relates to the field of ultrasonic transducers. More specifically, the present invention relates to elevation beam profile control of capacitive microfabricated ultrasonic transducers.

BACKGROUND OF THE INVENTION

An acoustic transducer is an electronic device used to emit and receive sound waves. Ultrasonic transducers are acoustic transducers that operate at frequencies above 20 KHz, and more typically, in the 1–20 MHz range. Ultrasonic transducers are used in medical imaging, non-destructive evaluation, and other applications. The most common forms of ultrasonic transducers are piezoelectric transducers. Recently, a different type of ultrasonic transducer, the capacitive microfabricated ultrasonic transducer, has been described and fabricated. Such transducers are described by Haller et al. in U.S. Pat. No. 5,619,476 entitled "Electrostatic Ultrasonic Transducer," issued Apr. 9, 1997. The Haller patent describes transducers capable of functioning in a gaseous environment, such as air-coupled transducers. Ladabaum et al., in U.S. Pat. No. 5,894,452 entitled, "Microfabricated Ultrasonic Immersion Transducer," issued Apr. 13, 1999, describe an immersion transducer (i.e., a transducer capable of operating in contact with a liquid medium), and, in U.S. Pat. No. 5,982,709 entitled, "Acoustic Transducer and Method of Microfabrication," issued Nov. 9, 1999, describe improved structures and methods of microfabricating immersion transducers. In U.S. Pat. No. 6,271,620 entitled, "Acoustic Transducer and Method of Making the Same," issued Aug. 7, 2001, Ladabaum describes improvements to microfabricated acoustic transducers which enable competitive performance with piezoelectric transducers.

The basic transduction element of the conventional capacitive microfabricated ultrasonic transducer is a vibrating capacitor. A substrate contains a lower electrode, a thin diaphragm is suspended over the substrate, and a metallization layer serves as an upper electrode. If a DC bias is applied across the lower and upper electrodes, an acoustic wave impinging on the diaphragm will set it in motion, and the variation of electrode separation caused by such motion results in an electrical signal. Conversely, if an AC signal is applied across the biased electrodes, the AC forcing function will set the diaphragm in motion, and this motion emits an acoustic wave in the medium of interest.

FIGS. 1A–1C illustrate the naming conventions, as well as the conventional focusing and scanning directions, in a typical transducer array used in medical imaging applications. As shown in FIG. 1A, the transducer 100 is typically made up of multiple transducer elements 110. Each of the transducer elements 110 includes a plurality of individual transducer cells. The transducer elements 110 are oriented such that their lengths are along the elevation axis, and their widths are along the azimuth axis. The transducer elements 110 are adjacent to one another along the azimuth axis. As shown in FIG. 1B, a transducer array 100 is conventionally focused to a focal spot 150 in the range direction and scanned in the azimuth direction electronically by applying an appropriate time delay to each of the transducer elements 110. As shown in FIG. 1C, focus in the elevation direction has conventionally been achieved with a mechanical lens 120. This mechanical focus is sub-optimal because adequate elevation focus is only obtained over a relatively small portion of the usable range. Whereas time-delay focusing in the azimuth plane is possible over the entire field of view (for example 0.5–6 cm for a linear small parts probe), elevation focus is only obtained over a relatively small spatial region of peak focus 130. A measure of the elevation focus achievable, as well as the depth of field over which good focus can be achieved, is often described by the term slice thickness.

Traditional ultrasound transducers have poor control of the slice thickness. A convex lens 120 focuses somewhere in the middle of the usable range, and the focus diverges, or becomes large, at ranges beyond the lens' peak focus 130. This divergent lens focusing creates volume averaging artifacts that obscure small cysts and other clinically relevant, yet small feature size, information. Furthermore, practical physical lenses are often lossy, which further decreases their effective use, because they are made from materials whose speed of sound is slower than the speed of sound in a body.

The elevation focus challenge is well known in the art, and various approaches to improve slice thickness, i.e., to decrease slice thickness, have been taught. For example, U.S. Pat. No. 4,670,683 to 't Hoen teaches that electronic phase delays between different sub-elements in the elevation direction can correct for the slice thickness short-comings of a mechanical lens. However, by requiring delay means in both transmit and receive between "central" and "side" electrodes in elevation, in addition to azimuth delay means, this invention necessitates significant system and transducer complexity.

U.S. Pat. No. 5,301,168 entitled, "Ultrasonic transducer system," filed Jan. 19, 1993, to Miller teaches that a multi-aperture transducer system, where elements are subdivided into multiple elevation apertures, can be used to improve slice thickness. However, the practical complexity of dividing M azimuth channels into N segments in elevation, the N segments grouped into E apertures, is a material disadvantage to this type of design. In order for each of the M channels to be able to have E apertures, switches are necessary in the path of the radio frequency (RF) signal (see, for example, the "combining network" in FIG. 8 of the Miller patent). Furthermore, mechanically segmented mechanical lenses are required to achieve good slice thickness for the varying apertures. Because of the cost and complexity of such an arrangement, it is desirable to have an ultrasonic probe with good slice thickness that is simpler to make. It is also desirable to have ultrasonic probes with minimal losses due to the lens losses and without the need for combining network switches in the RF path.

U.S. Pat. No. 5,651,365 to Hanafy et al. teaches that slice thickness can be improved by using two sets of interleaved azimuthal transducer elements, each set having a different elevation aperture. One set is used for optimized focus at a certain range, and the second set is used for an optimized scan at a different range. However, this approach negatively impacts at least one of efficiency, lateral resolution, or frame rate.

U.S. Pat. No. 5,415,175 to Hanafy et al. teaches that by varying the thickness and curvature of a piezoelectric element along the elevation direction, that frequency dependent elevation focusing can be achieved. While this invention is known to those skilled in the art as resulting in ultrasound probes with improved slice thickness performance over conventional probes, the elevation aperture is problematic for low-frequency, relatively narrow-band signals such as those emanating from deep within the tissue. Furthermore, fabrication of these curved surfaces is challenging and consequently expensive.

U.S. Pat. No. 6,381,197 to Savord et al. (e.g., FIGS. 5A and 5B of the Savord patent) teaches that bias rows in the elevation direction of a microfabricated ultrasonic transducer (MUT) can be connected to bias sources, and that by using these bias sources to selectively energize elevation rows, the elevation aperture of a MUT can be controlled. The Savord patent further teaches that elevation apodization can be achieved by varying the gain in the elevation direction with the bias rows; inherent in the Savord apodization teaching is the complexity of multiple bias sources each at different voltage amplitudes, which is not desirable in practical applications. As taught by the Savord patent, control of aperture and apodization by varying the magnitude of the bias on a MUT is effective only in receive operation. During transmission, the MUT cannot be effectively turned off by bias amplitude alone and is operated outside of its linear range, that is, with the transmit pulse itself essentially biasing the transducer. Thus, it is desirable to provide a means for aperture control that is equally effective in both transmit and receive operation. It is also desirable to provide a simple means for apodization that is effective in both transmit and receive operation.

It has been realized by the present inventors that a judiciously chosen spatial variation of the sign of the bias voltage is an effective way to control the transmit radiation of a MUT surface. It has been further realized by the present inventors that varying the sign of the bias voltage results in a 180 degree phase shift of the transmitted wavefront, and that this phase shift can be used to create Fresnel lens effects with microfabricated ultrasonic transducers. The Savord patent neither teaches nor suggests such control via spatial distribution of bias polarity.

Thus, the polarity of bias can modulate the phase, in elevation for example, of both the transmitted and received ultrasonic waveform. This bias-polarity-based phase modulation can be used to effectively control the aperture of a MUT device by providing precise cancellation of both transmitted and received acoustic energy. This bias-polarity-based phase modulation can also be used to create focus in the far field without using a mechanical lens, or to enhance focusing when combined with other lensing means. It can also be used to greatly simplify the design and implementation of probes with excellent slice thickness performance.

SUMMARY OF THE INVENTION

The present invention provides a means to control the phase profile of a capacitive microfabricated ultrasonic transducer (cMUT) element or array of elements by varying the spatial distribution of the sign of the bias voltage on the cMUT.

The present invention provides a cMUT that can be focused in the elevation direction by varying the sign of the applied bias in the elevation direction. In one aspect of the present invention, elevation focusing is achieved without the aid of a mechanical lens. The cMUT of the present invention provides enhanced multi-row focusing performance without the expense and complexity of the high-voltage switches required in multi-row probes and without the signal degradation that occurs when the RF signal passes through these lossy, high voltage switches. Additionally, the present invention provides a simple and effective means for controlling the aperture of a microfabricated ultrasonic transducer in both transmit and receive operation. The present invention also provides a means for steering the cMUT transmission beam in the elevation direction.

The present invention achieves these and other goals by providing a method for controlling the elevation slice thickness in both the near field and the far field of a cMUT's usable range. The near field improvement is obtained by reducing both the effective radiating and receiving aperture. In the far field, phase focusing is applied to reduce the slice thickness. In many applications of medical ultrasound, it is advantageous to split the displayed image into several "focal zones" that result from individual transmit firings. Combining these focal zones leads to a composite image more closely approximating a confocal system. With aperture control and phase focusing, the elevation focal length can be altered to match the azimuth focus in each focal zone of the image.

Both effects are achieved by alternating the polarity of the bias across the elevation aperture. This is achievable in a microfabricated transducer by splitting the common electrode, which is typically continuous, into several elevation electrodes and does not require additional coaxial connections to the transducer, since all of the control is exerted by bias polarity. Further, all of the bias lines to be switched are at RF ground, which eliminates the disadvantages of complexity and signal degradation when switches are in the path of the RF signals.

Reduction of the effective aperture is implemented by alternating the polarity of the bias on the elevation electrodes with sufficiently fine spatial resolution so as to cancel the fields from the affected elements. Per-focal-zone enhancement to far-field operation works using a Fresnel zone plate.

BRIEF DESCRIPTION OF THE DRAWINGS

The present invention will become more apparent from the detailed description set forth below when taken in conjunction with the drawings in which like reference characters identify correspondingly throughout and wherein:

FIG. 8 illustrates bias voltage patterns corresponding to an embodiment of the present invention.

DETAILED DESCRIPTION

The present invention will now be described in detail with reference to the drawings, which are provided as illustrative examples of the invention so as to enable those skilled in the art to practice the invention. Notably, the figures and examples discussed below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components that are, by way of illustration, referred to within this disclosure.

The present invention provides a capacitive microfabricated ultrasonic transducer (cMUT) with control of elevation phase through bias polarity variation. Such control of elevation phase results in simple ultrasonic probes with excellent slice thickness attributes. Furthermore, tight spatial variation of phase results in an effective way to achieve both transmit and receive aperture and apodization control. Further still, such transducers can achieve their elevation focus without the need of a lossy mechanical lens. An exemplary embodiment of the present invention includes a cMUT array, which is made up of transducer elements having transducer cells. The cMUT array is coupled to control circuitry that provides the tight spatial variation of phase using bias polarity.

Figure 1A:
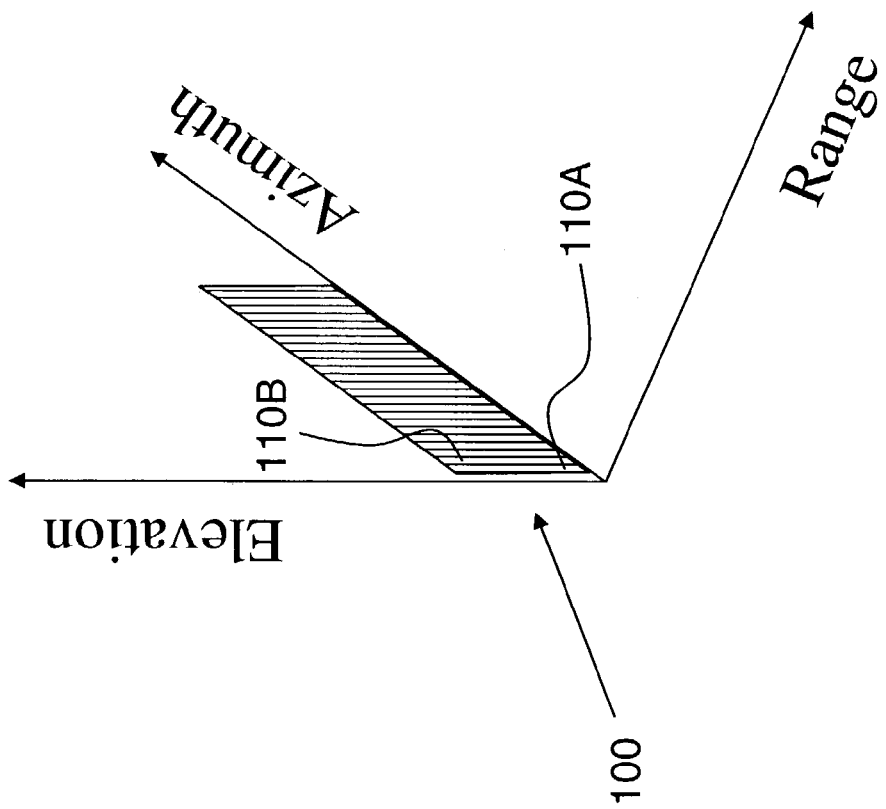
FIGS. 1A–1C illustrate the naming conventions, as well as the conventional focusing and scanning directions, in a typical multi-element array transducer used in medical imaging applications.
Figure 1B:
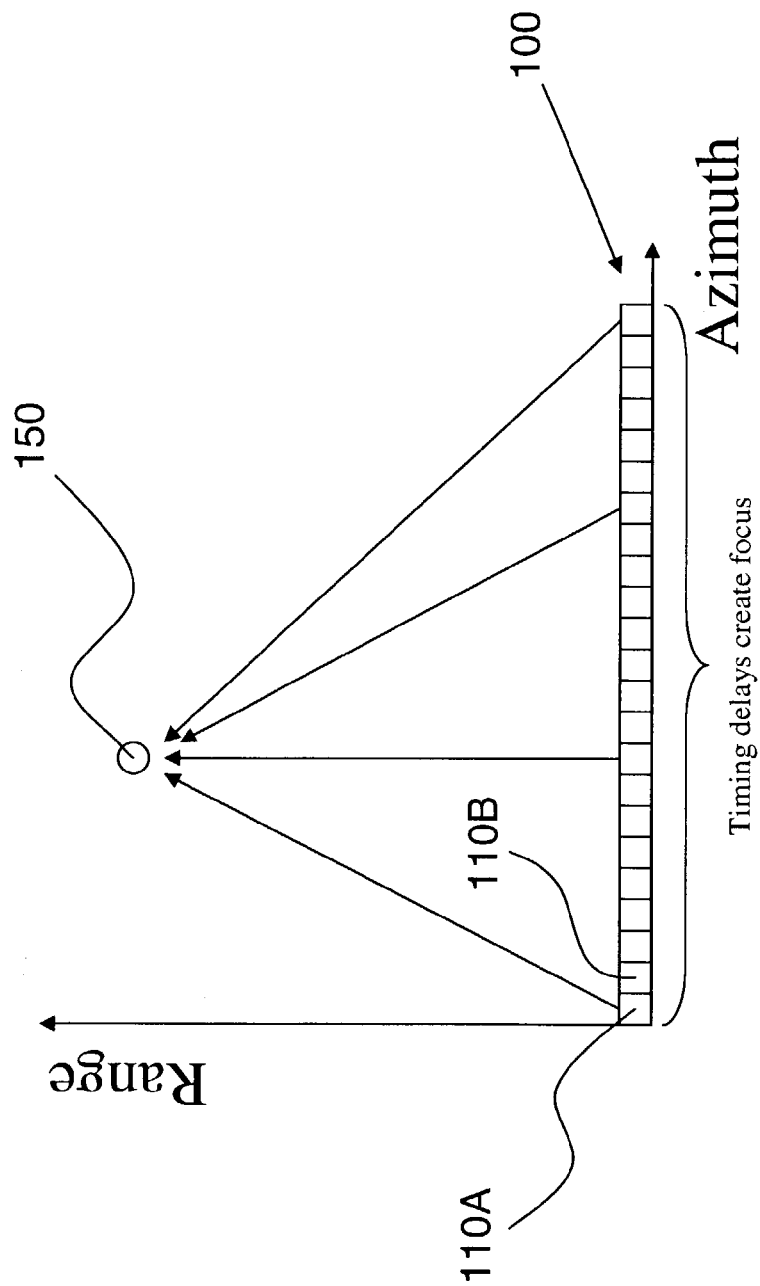
Figure 1C:
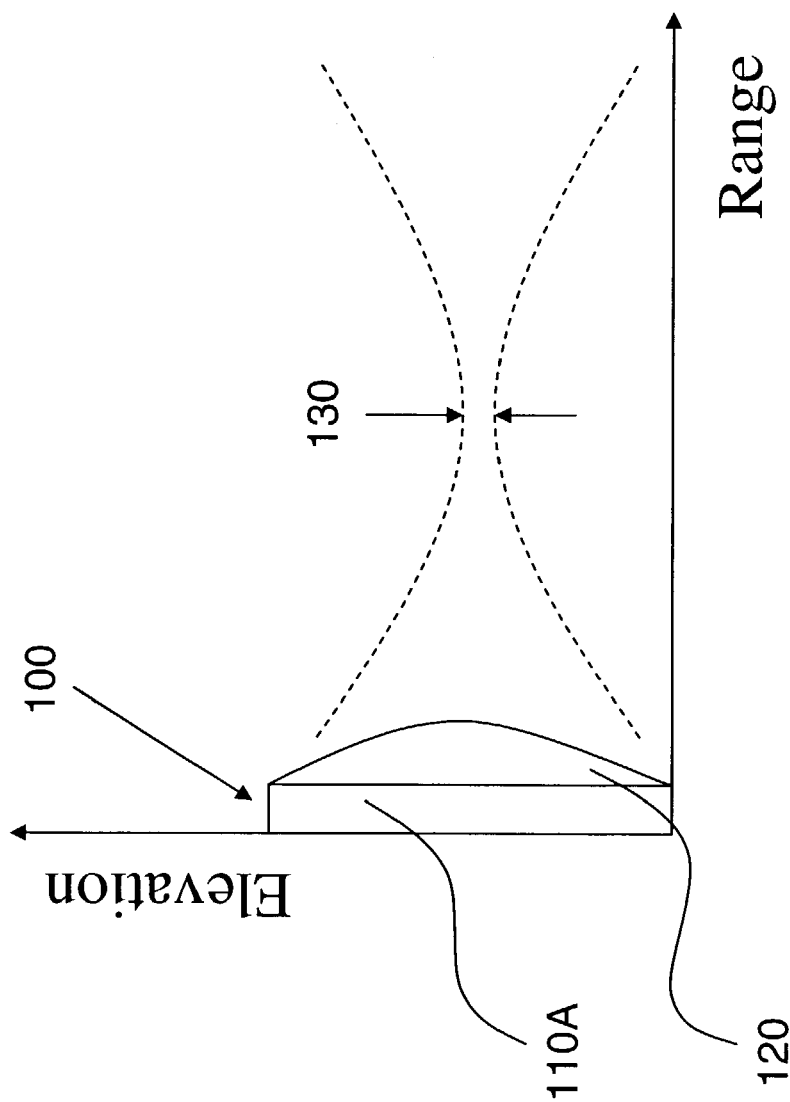
Figure 2:
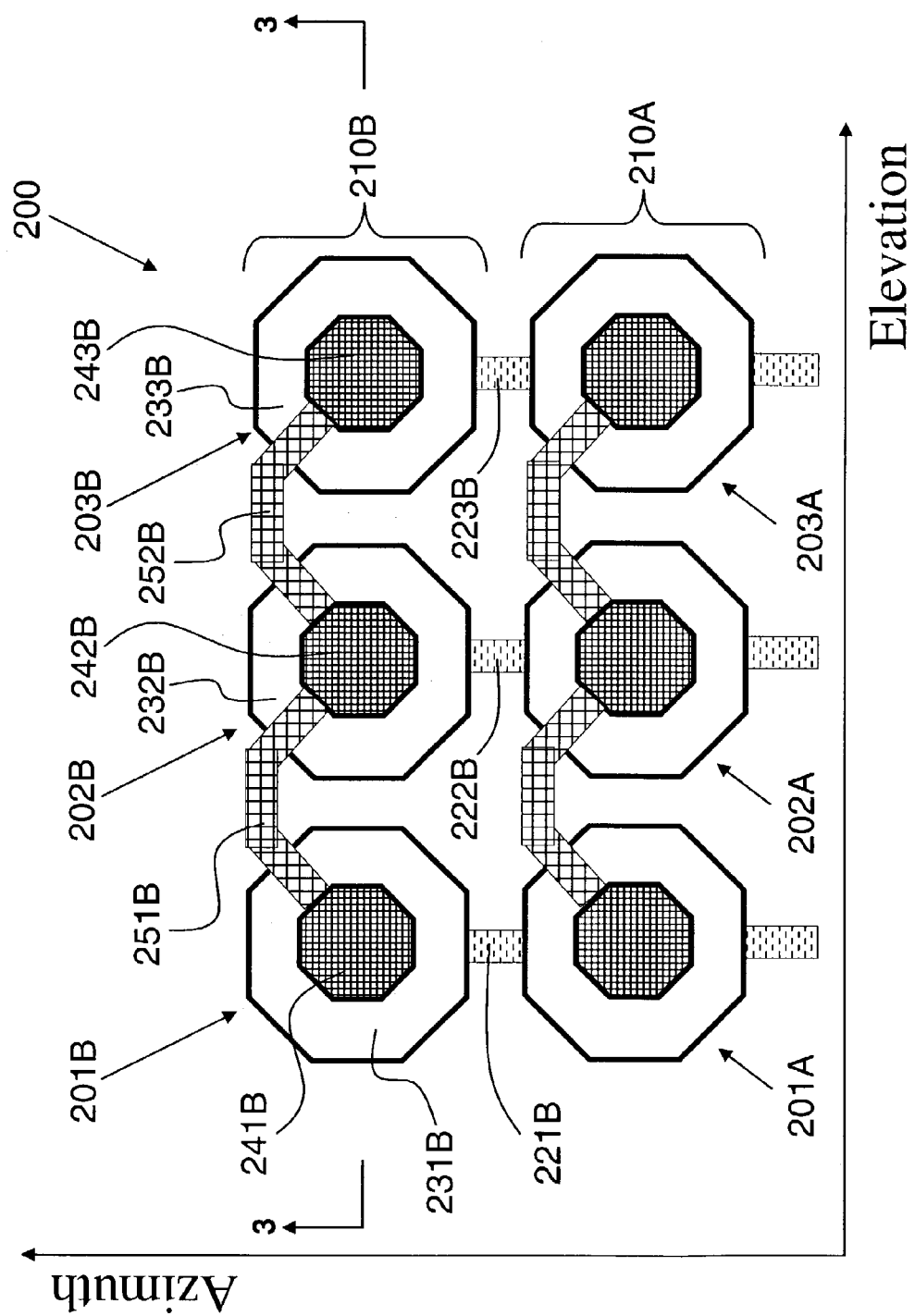
FIG. 2 illustrates a top view of a transducer of one embodiment of the present invention.
Figure 3:
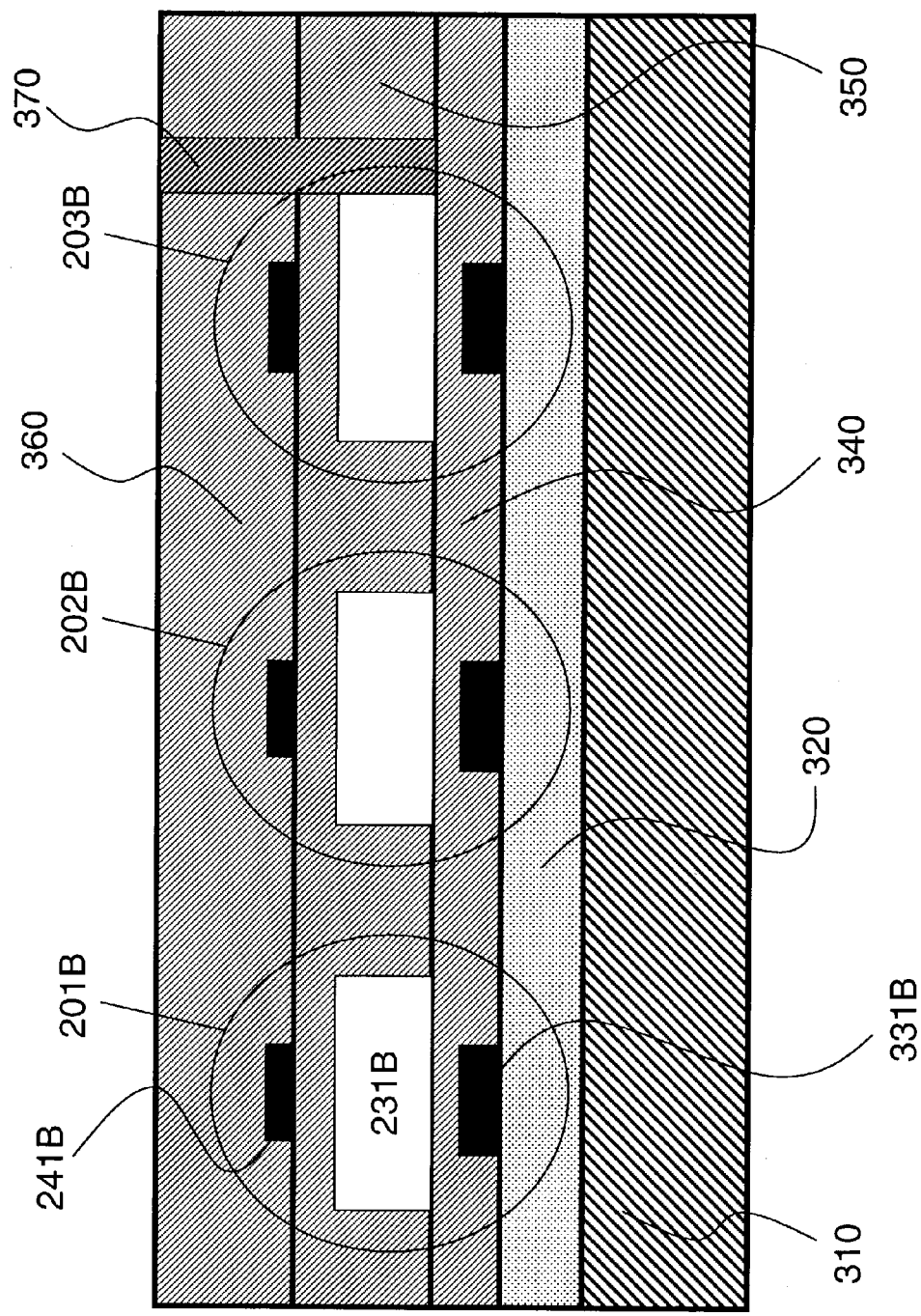
FIG. 3 illustrates a cross-section view of a transducer of one embodiment of the present invention.

FIGS. 2 and 3 illustrate a cMUT array formed according to an embodiment of the present invention. It will become apparent to one skilled in the art that any number of transducer cells can make up a transducer element, and any number of transducer elements can make up a cMUT array. The present invention is intended to incorporate this variability, and not be limited to the exemplary embodiments provided.

FIG. 2 illustrates a top view of an embodiment of a cMUT array 200 according to the present invention. As shown in FIG. 2, the cMUT array contains two transducer elements 210, with each of the transducer elements containing three transducer cells 201, 202 and 203. The cMUT array 200 can, for example, be similar to that disclosed in U.S. Pat. No. 6,271,620 issued Aug. 7, 2001 to Ladabaum and entitled "Acoustic Transducer and Method of Making the Same." Transducer element 210B contains three transducer cells 201B, 202B and 203B. Each of the transducer cells 201B, 202B and 203B has a top electrode 241B, 242B and 243B, respectively, and a bottom electrode (shown in FIG. 3), and a void region 231B, 232B and 233B, respectively. Transducer cells 201B, 202B and 203B are interconnected along their top electrodes 241B, 242B and 243B in the elevation direction by intra-element interconnects 251B and 252B. Corresponding transducer cells 201A–201B, 202A–202B and 203A–203B of adjacent transducer elements 210A–210B are interconnected in the azimuth direction by inter-element interconnects 221B, 222B and 223B to form elevation rows. The cross section 3—3 of FIG. 2 is shown in FIG. 3.

FIG. 3 illustrates a cross-section of transducer element 210B of an embodiment of the present invention. As shown in FIG. 3, transducer cells 201B, 202B and 203B are formed using the methods, for example, disclosed in co-owned U.S. patent application Ser. No. 09/898,035 filed Jul. 3, 2001 to Ladabaum and entitled "Method for Making Acoustic Transducer." Illustratively, transducer cell 201B can be constructed in the following manner. A layer of thermal oxide 320 is grown over a substrate 310. A first conductive layer is then deposited and etched to form the lower electrode 331B. Thereafter, a lower insulation layer 340 is deposited. On top of the lower insulation layer, a sacrificial layer is deposited and etched, resulting in sacrificial portions that will ultimately become the void region 231B. A middle insulation layer 350 is deposited over the sacrificial portions. A second conductive layer is then deposited and etched to form the upper electrode 241B. A top insulation layer 360 is then deposited over the top electrode 241B. At this point, the sacrificial portions are etched away through via holes, with the via holes being subsequently filled with insulation material 370.

The present invention is not meant to limit the specific exemplary geometries of and methods of making the above-described transducer elements and cells. Additionally, the size and shape of the transducer cells are not meant to be limited to a single octagonal design; rather, each transducer cell could be a different size and a different shape from each of the other transducer cells.

Figure 4:
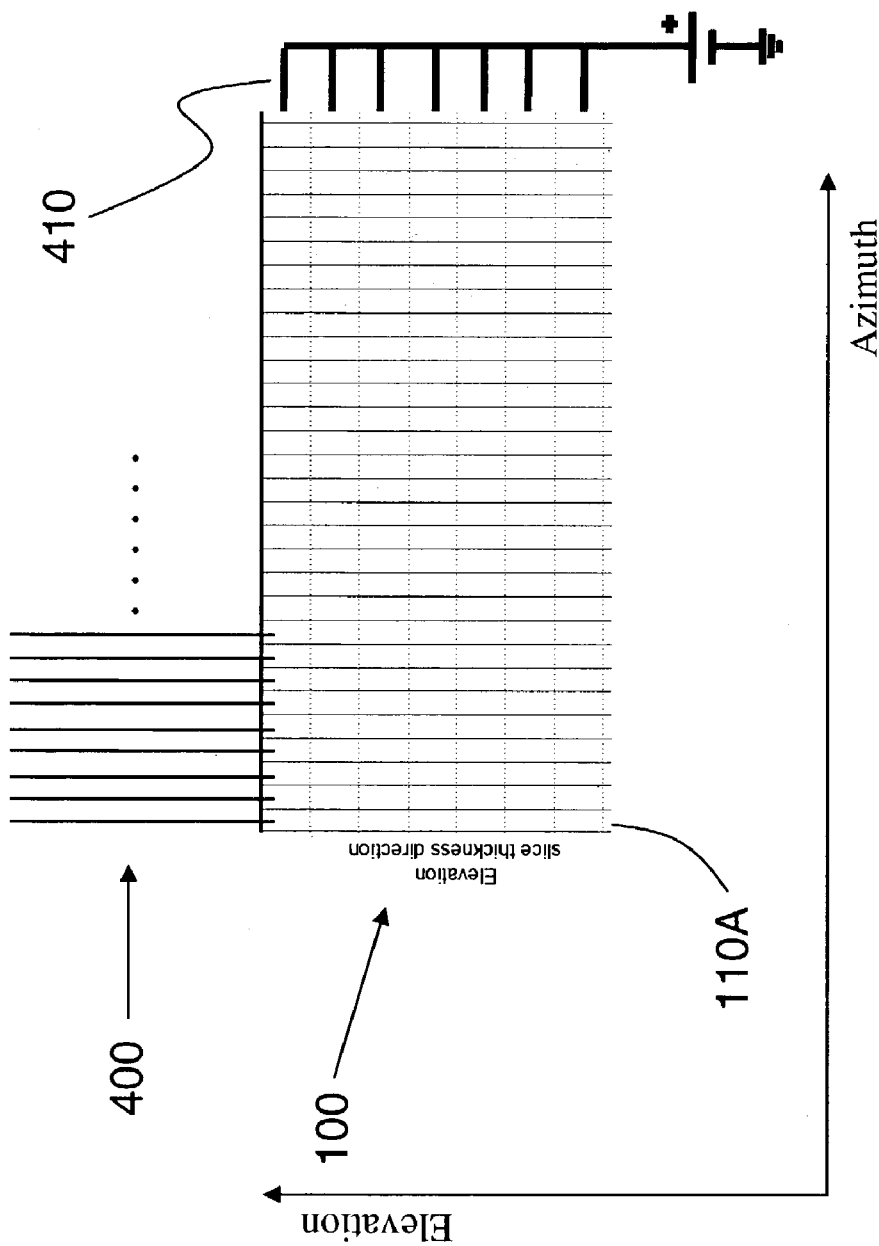
FIG. 4 illustrates the electrical schematic for the conventional transducer system.

FIG. 4 shows the traditional cMUT array 100 external circuit connections. As shown, typically one azimuth element connection 400 is connected to the top electrode of one series of transducer cells making up a transducer element 110A of the traditional cMUT array 100. All of the bottom electrodes of the cMUT array 100 are commonly connected 410 and, therefore, commonly biased.

Figure 5:
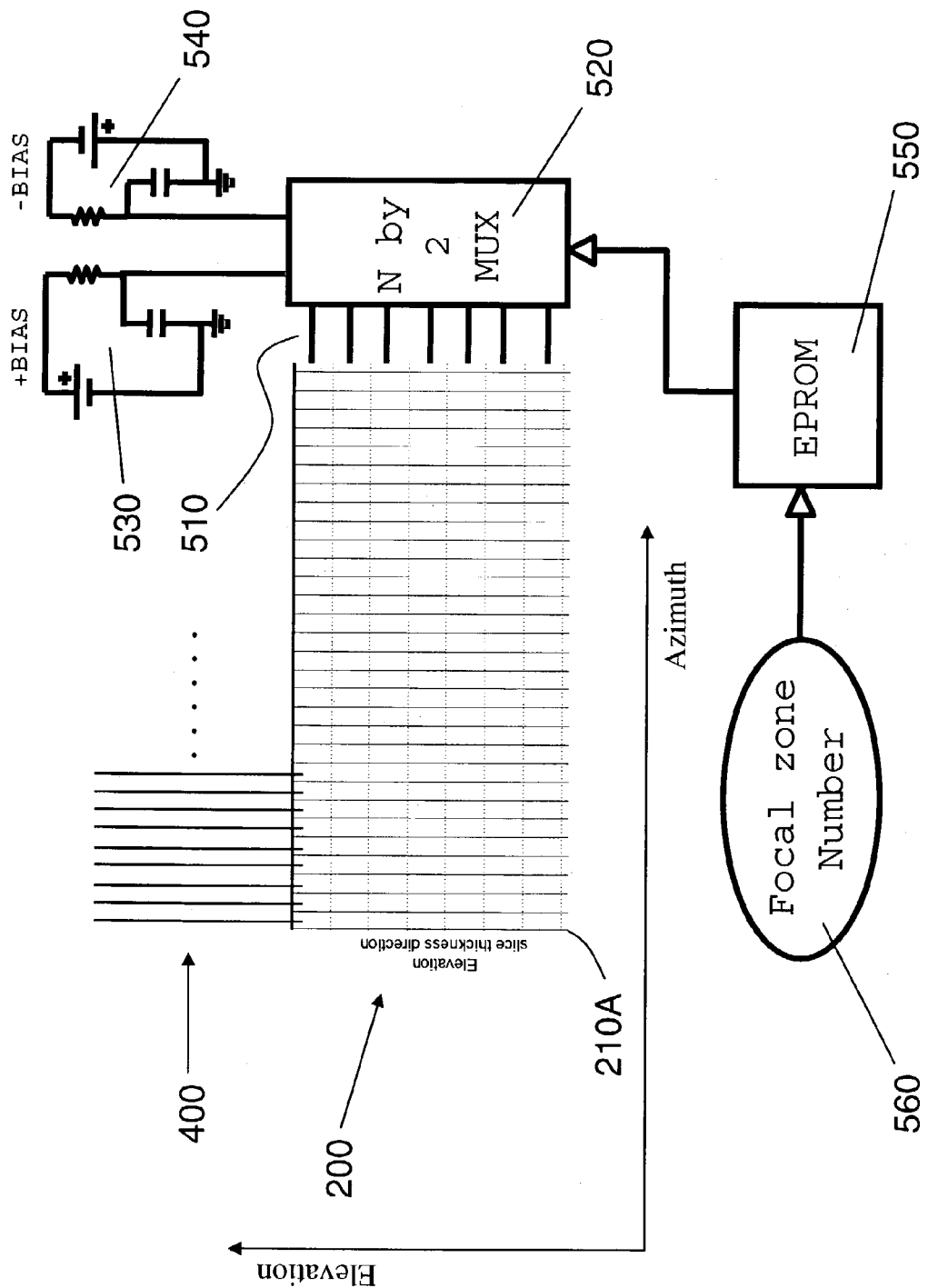
FIG. 5 illustrates the electrical schematic for the transducer system of an embodiment of the present invention.

FIG. 5 shows the cMUT array 200 external circuit connections of an embodiment of the present invention. As with the traditional array of FIG. 4, the top electrode of each transducer element 210A is connected externally to an azimuth element connection 400. However, in this exemplary embodiment, the bottom electrodes of corresponding transducer cells of adjacent transducer elements are connected together to form elevation rows. Each elevation row is externally connected 510 to a separate output channel of an N by 2 multiplexer 520. The multiplexer 520 inputs are a positive 530 and negative 540 bias voltage. The multiplexer 520 control signal comes from an EPROM 550 lookup table using a focal zone number 560 pointer.

In operation of the exemplary embodiment of the present invention as shown in FIG. 5, the sign of the bias to the elevation rows is changed in order to invert the transmit signal for some of the elevation electrodes. This has the effect of creating a Fresnel zone plate. This focusing can be accomplished on transmission as well as reception. However, for simplicity, the following description will be in terms of the transmission, but reception operates in a similar manner.

The multiplexer routes either the positive or negative bias voltage to the N elevation row connections, based on a lookup table in the EPROM 550. Each bias line is an RF ground. The EPROM 550 address is, for example, a number provided by the system, based on excitation voltage timing, which tells the probe which focal zone is in use, and optionally information about the center frequency and bandwidth of the excitation pulse. Data in the EPROM 550 converts this to the bias sign arrangement for a given focal zone, and the focal length of the zone plate is determined by these bias signs.

The zone plate, as described above in this embodiment of the present invention, operates similarly to a classical Fresnel lens, but is adapted to cMUT elevation focusing. For example, if the center of the elevation electrode is located at $y_i$, then the phase $\phi_i$ required for focusing in a classical Fresnel lens is:

$$\phi_i = \frac{2\pi f}{c}\sqrt{r^2 + y_i^2} - r,$$

where f is the frequency, r is the desired focusing range, and c is the speed of sound in the medium of interest. However, the present invention does not provide for continuous phase-shifting, as in a classical Fresnel lens. Rather, the present invention provides for discrete 180 degree phase shifts; it is essentially a cMUT zone plate. Therefore, the ideal continuous phase variation must be converted to discrete sign information to give the cMUT bias voltages: $s_i$=sign(mod ($\phi_i$,2π)−π). Fortunately, the necessary elevation focusing with a multi-row probe is rather crude, so this simple arrangement reduces the unwanted out-of-plane energy to the −20 dB level that is sufficient to demonstrate all of the improvements in the image made possible with a practical multi-row transducer (i.e., 5–6 rows).

It will be understood by those skilled in the art that there are numerous methods and circuits by which positive and negative bias voltages can be connected to and combined with the elevation rows of the present invention. These additional bias voltage connection methods and circuits are meant to be included within the scope of the present invention.

Specifically, in another embodiment, the multiplexer-EPROM combination of the present invention can be replaced with any commonly known switching and selection circuitry combination. For example, such components as: discrete relays, discrete transistors, solid state transistors and other solid state switches can be used. Likewise, instead of the EPROM storing multiple, real-time selectable, polarity patterns, a manual pattern selection circuit can be used. Further, the positive and negative bias voltages of the present invention can be hard-wired directly to the elevation rows or directly to the switching components. In this embodiment, the polarity pattern for a particular application is pre-selected and the appropriate bias voltage directly connected to the appropriate elevation row, or elevation row switch, according to the pre-selected polarity pattern. Finally, in this embodiment, the MUT device of the present invention can have a combination of hard-wired and switched bias voltages.

In a further embodiment, the positive and negative bias voltages can either be discretely generated off of the MUT device of the present invention, be generated locally with the MUT device of the present invention, or be a combination of discretely and locally generated. In the first aspect of this embodiment, discrete generation, the bias voltages can, for example, be included in the application probe handle or be generated elsewhere in the application system. In this aspect, the bias voltages can, for example, be tied to the MUT device using wires, cables, harnesses, connectors, and the like. In the second aspect of this embodiment, local generation, the bias voltage generation circuitry can be included beside the MUT device, on the same or an adjacent die, or beneath the MUT device, within the MUT device substrate.

In yet another embodiment, the positive and negative bias voltages can be more numerous than the two shown in FIG. 5. Specifically, in operation, each MUT elevation row can, for example, have its own particular bias voltage, that bias voltage being a particular combination of amplitude and polarity. Additionally, in this embodiment, the quantity of bias voltages could outnumber the quantity of elevation rows, with some bias voltages being used for certain applications, while others are used for different applications.

Figure 6A:
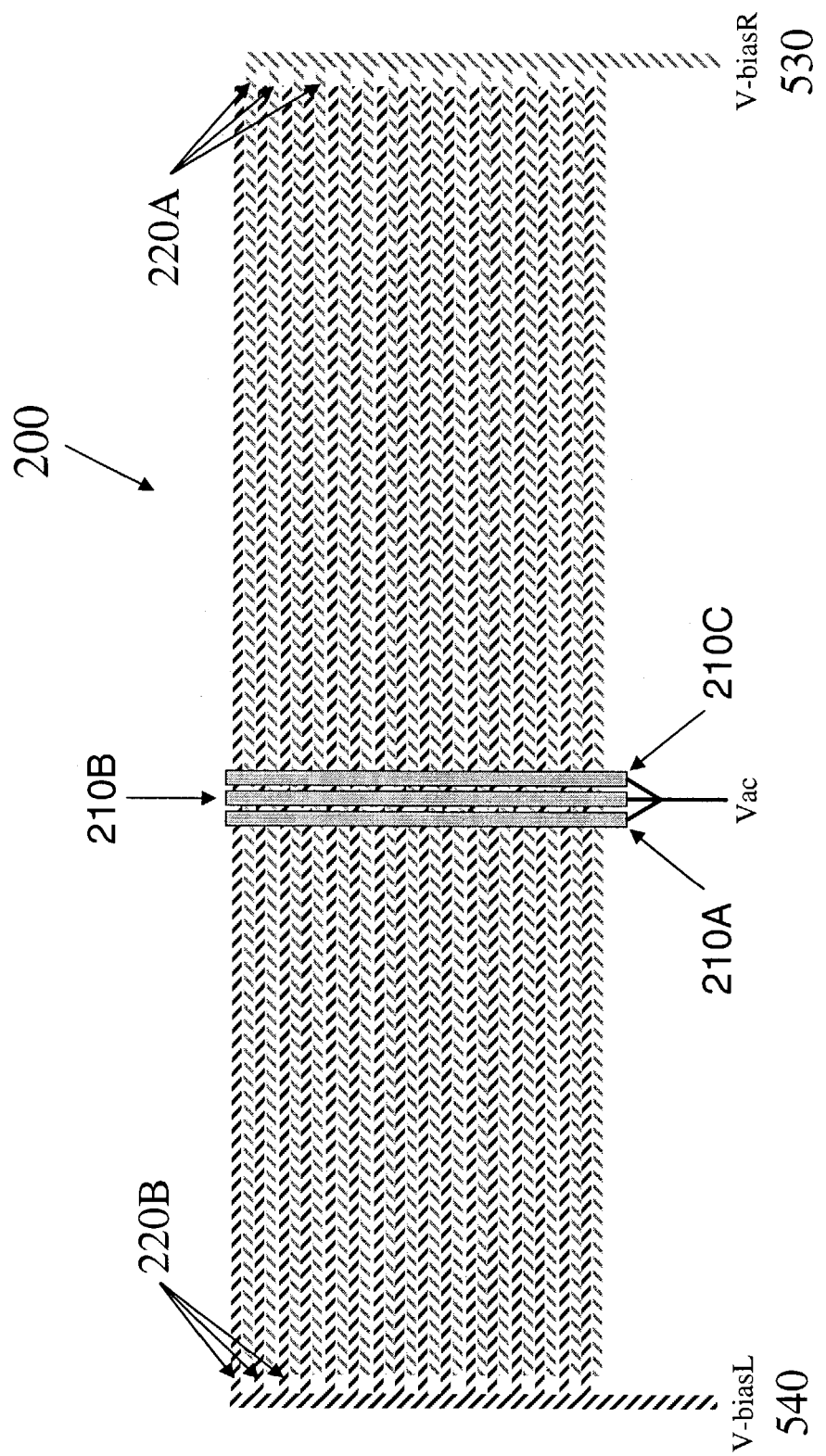
FIGS. 6A–6C illustrate the experimental design and experimental results verifying the aperture control aspect of the present invention.
Figure 6B:
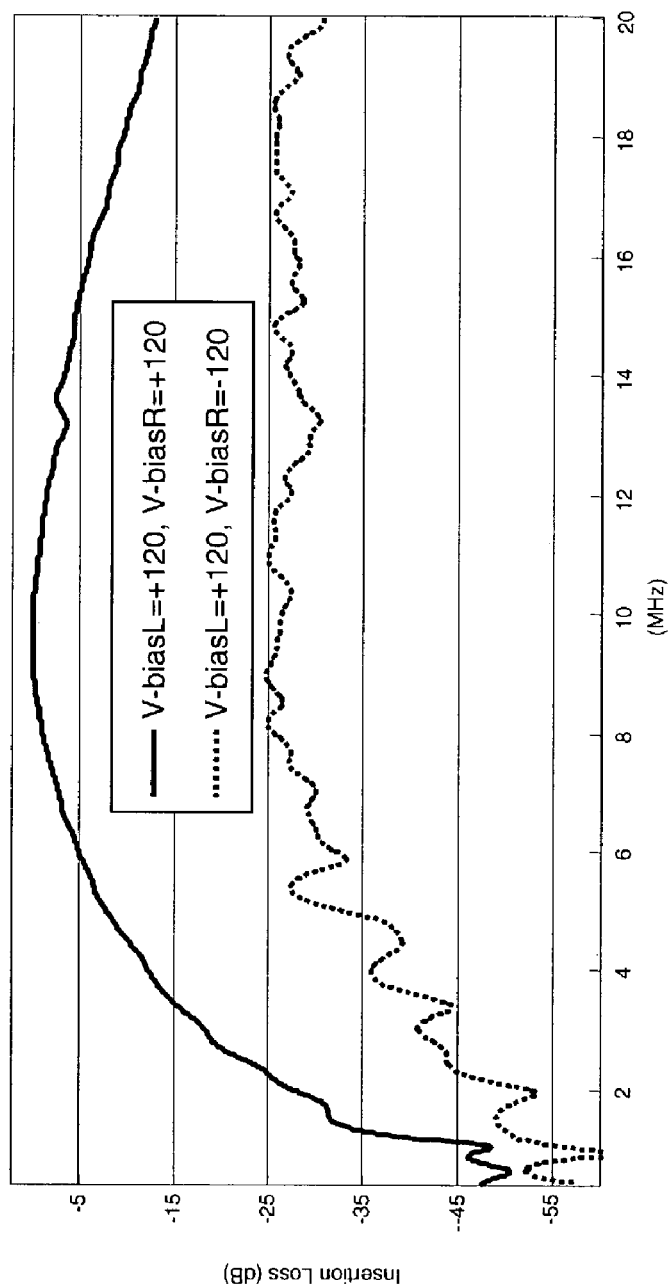
Figure 6C:
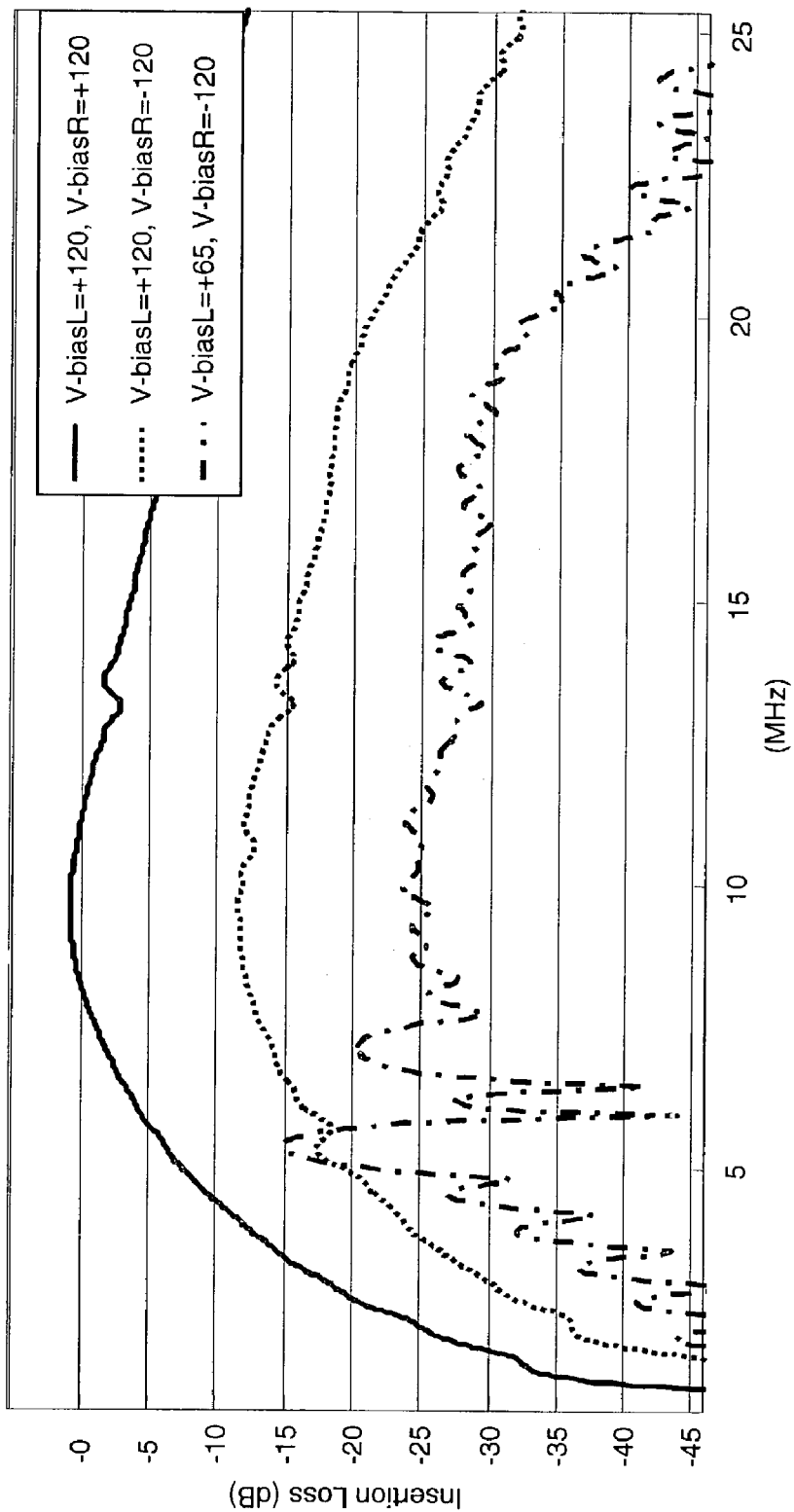

For best image quality, it is necessary to be able to reduce the elevation aperture in the near field. Alternating the bias, as in an embodiment of the present invention, when the elevation electrodes are on the order of half wavelength across, is an effective method to cancel the sound output and can be used for aperture control and apodization. FIGS. 6A–6C illustrate the feasibility of such an approach.

FIG. 6A illustrates a specific design of an experiment where 3 azimuth elements 210A–C of a cMUT array 200 are connected to a transmit channel. The entire array consists of 192 azimuth elements with 10 MHz center frequency, but only 3 azimuth elements are used in the presented experiment. The array 200 contains two sets of elevation electrodes 220A and 220B. These electrodes are approximately 100 microns wide, and connect the cMUT cells of adjacent elements 210A, 210B, and 210C in an alternating (i.e., interdigitated) manner to bias voltage V-biasL 540 or V-biasR 530. Elements 210A–C are each, for example, approximately 200 microns wide.

FIG. 6B illustrates the relative strength of a received signal by a hydrophone when the array elements 210A–C of FIG. 6A are biased uniformly in elevation, and when their elevation bias is alternated every 100 microns. The transmit pulse in this experiment was small relative to the magnitude of V-bias. As can be seen in FIG. 6B, alternating the bias of cMUT elevation rows can effectively turn off that section of the device, which is evidenced by the approximately 25 dB relative difference at 10 MHz.

FIG. 6C illustrates the feasibility of another aspect of the embodiment of FIG. 6A, which is that, when transmit voltages are large compared to the magnitude of V-bias, the transducer will operate non-linearly. At these relatively large transmit voltages, it may be necessary to apply different magnitudes of positive and negative bias voltages. As can be seen in FIG. 6C, 25 dB of isolation is possible, when alternating positive and negative bias voltages with magnitudes of 65V and 120V, respectively. Equal magnitude positive and negative bias voltages are less effective at canceling the radiated sound because the pressure created by a relatively large transmit voltage in the direction of bias is different from the pressure created by a relatively large transmit voltage in the opposite direction of the bias.

Figure 7B:
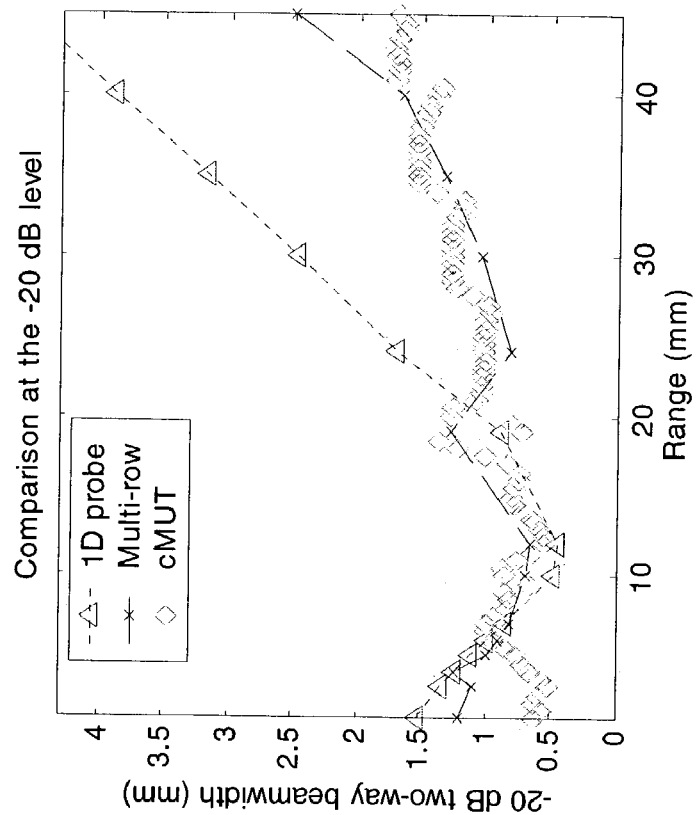
FIGS. 7A–7B illustrate simulation results comparing conventional transducers with the present invention.
Figure 7A:
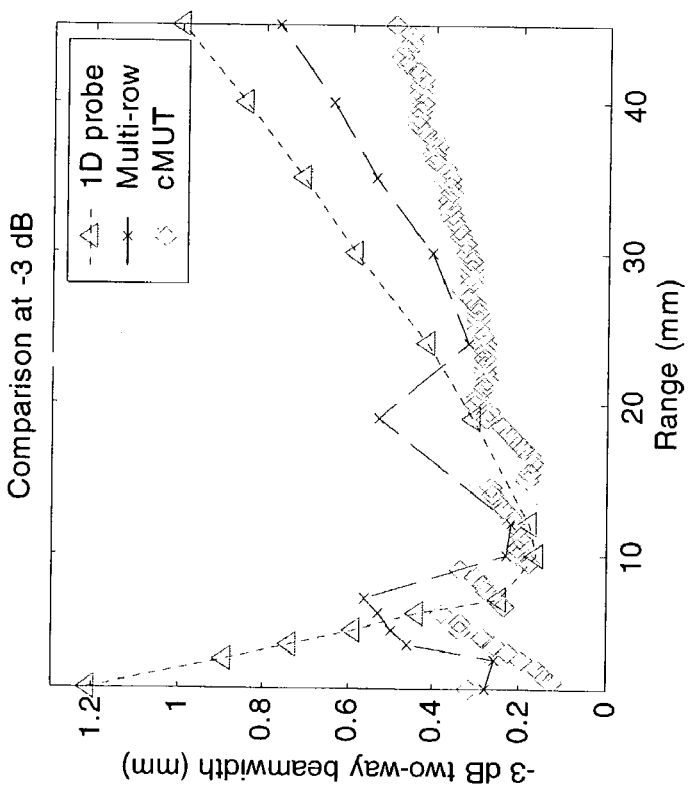

FIGS. 7A–7B illustrate the improvements of the present invention over the traditional 1D probe and an exemplary, state-of-the-art, multi-row piezoelectric transducer array. As shown in the simulations, the present invention provides an improved far-field beam width at both the −3 dB and −20 dB levels. This improvement stems from the use of the Fresnel lensing attributes of the present invention. The present invention also improves near-field improvements which are the result of the aperture control attributes verified in FIGS. 6A–6C. The simulations of FIGS. 7A–7B are based on a design of 52 elevation rows, each approximately 100 microns in width, operated with different bias patterns at different focal zones.

Figure 8:
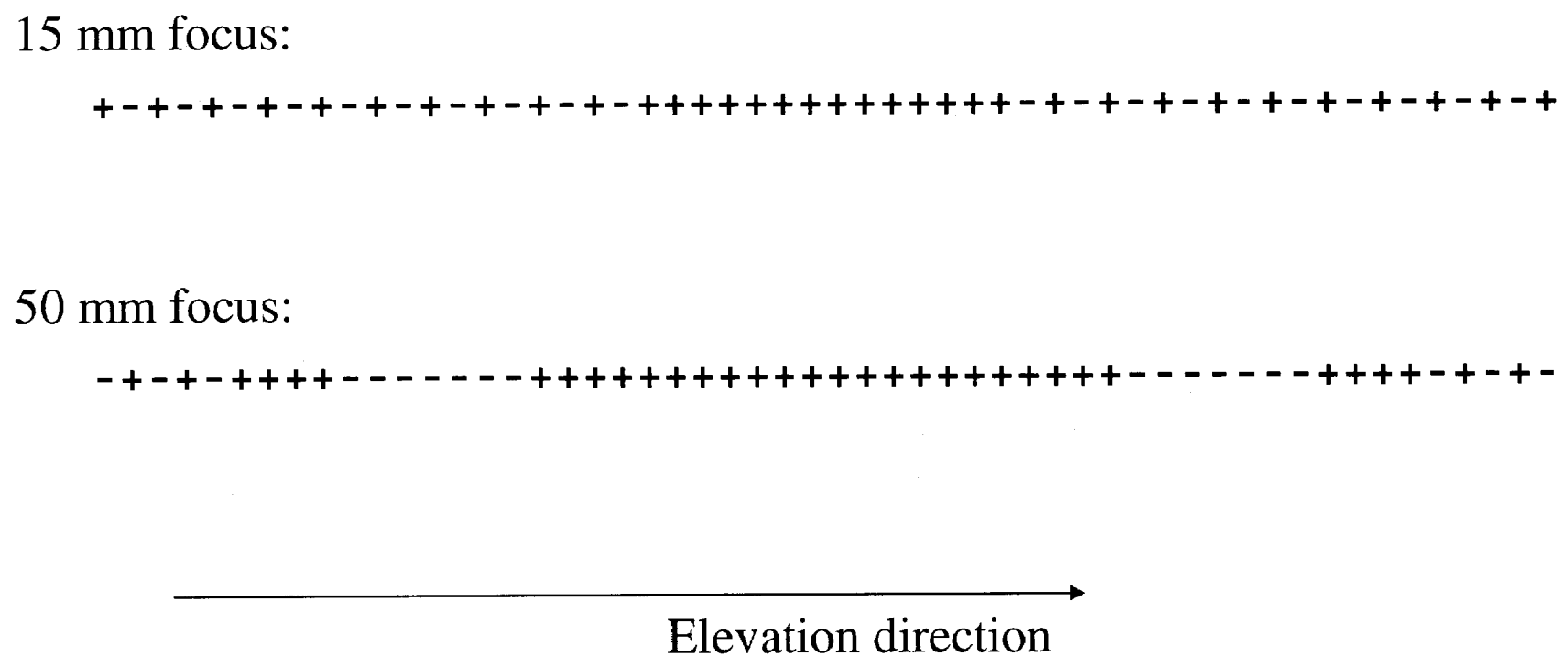

Since the focusing and aperture control of the present invention is unusual, it is possible, but unlikely, that assigning the bias pattern by a simple algorithm such as the Fresnel scheme described above will provide the optimized performance. Thus, the EPROM architecture has been introduced so that bias patterns resulting from time-consuming optimization computations can be practically accessed in a real probe. For example, FIG. 8 illustrates bias voltage patterns for the elevation control lines that can be used to enhance the 15 mm and 50 mm focus (in the range direction) of the probe simulated in FIGS. 7A–7B. However, it should be understood that there exists a virtually infinite combination of polarity patterns and bias voltages, and that these combination are meant to be included within the scope of the MUT device of the present invention.

In an embodiment of the present invention, with elevation focusing accomplished using alternating bias, the traditional polymer lens becomes unnecessary. Such a probe benefits from the fact that losses in the lens are avoided. In another embodiment of the present invention, elevation focusing is accomplished using both bias polarity aperture control and some form of mechanical lensing. This mechanical lensing can be either conventional polymeric lensing or transducer curvature, as disclosed in co-owned and concurrently filed U.S. patent application Ser. No. 10/367,112 entitled "Microfabricated Transducers with Curvature and Method of Making the Same." Fresnel lensing for focus optimization beyond the mechanical lens' focal zone can further be applied. In yet another embodiment of the present invention, the bias pattern can be changed between transmit and receive beams so that multi-focal-zone operation, as is known in the art of multi-row probes, is possible.

In another aspect of the present invention, the cMUT beam can be steered in the elevation direction. When the amplitudes and the polarities of the bias voltages are varied, the focusing of the cMUT beam can be non-normal to the center of the cMUT elements in the elevation direction. The non-normalcy is such that the center point of the peak elevation focus in the elevation direction is off-center to the center of the transducer elements in the elevation direction.

Although the present invention has been particularly described with reference to the preferred embodiments thereof, it should be readily apparent to those of ordinary skill in the art that changes and modifications in the form and details thereof may be made without departing from the spirit and scope of the invention. For example, those skilled in the art will understand that variations can be made in the type, number and arrangement of components illustrated in the above diagrams; the multiplexer-EPROM configuration can easily be replaced with other components. Further, more than two bias voltages with varying combinations of magnitudes and pluralities can be used by, and are intended to be within the scope of, the present invention. It is intended that the appended claims include such changes, modifications and combinations.

What is claimed is:

1. An acoustic transducer element, comprising:
   a plurality of acoustic transducer cells, each acoustic transducer cell including a pair of electrodes; and
   a circuit adapted to apply one of a plurality of bias voltages to each pair of electrodes,
   wherein:
      the plurality of bias voltages include a positive bias voltage and a negative bias voltage;
      the positive bias voltage is applied as the one bias voltage to at least a first pair of electrodes; and
      the negative bias voltage is applied as the one bias voltage to at least a second pair of electrodes.

2. The acoustic transducer element of claim 1, wherein:
   each pair of electrodes includes a first electrode and a second electrode; and the circuit comprises:
      a first connection node including the first electrode of each pair of electrodes;
      a plurality of second connection nodes, each second connection node including the second electrode of at least one pair of electrodes; and
      connecting circuitry adapted to couple the plurality of bias voltages between the first connection node and the plurality of second connection nodes.

3. The acoustic transducer element of claim 2, wherein the connecting circuitry comprises at least one of:
   at least one multiplexer;
   at least one relay;
   at least one transistor; and
   hard-wiring.

4. The acoustic transducer element of claim 3, wherein the connecting circuitry comprises:
   a plurality of bias voltage inputs connected to the plurality of bias voltages;
   a plurality of bias voltage outputs connected to the plurality of second connection nodes; and
   a selection input, the selection input connected to a designated bias voltage pattern.

5. The acoustic transducer element of claim 4, further comprising selection circuitry adapted to identify the designated bias voltage pattern.

6. The acoustic transducer element of claim 5, wherein the selection circuitry comprises:
   a memory unit, the memory unit including a look-up table containing at least one bias voltage pattern; and
   a means for pointing to the designated bias voltage pattern from within the look-up table.

7. The acoustic transducer element of claim 6, wherein the memory unit is an erasable, programmable, read only memory (EPROM).

8. The acoustic transducer element of claim 6, wherein:
   the at least one bias voltage pattern corresponds to a focal zone number, and
   the means for pointing includes a system generated focal zone number pointer.

9. The acoustic transducer element of claim 1, wherein the positive bias voltage has an amplitude different than the negative bias voltage.

10. The acoustic transducer element of claim 1, wherein the plurality of bias voltages are generated discretely and separately from the acoustic transducer element.

11. The acoustic transducer element of claim 1, wherein the plurality of bias voltages are generated locally to the acoustic transducer element.

12. The acoustic transducer element of claim 1, wherein the circuit varies, as a function of time, an amplitude and a polarity for at least one bias voltage of the plurality of bias voltages.

13. The acoustic transducer element of claim 12, wherein the amplitude and the polarity are varied such that elevation focus in a range direction is different from that of a uniformly biased acoustic transducer element.

14. The acoustic transducer element of claim 12, wherein the amplitude and the polarity are varied such that a center point of a peak elevation focus in an elevation direction is off-center to the acoustic transducer element in the elevation direction.

15. An acoustic transducer array, comprising:
   a plurality of acoustic transducer elements, each acoustic transducer element including a plurality of acoustic transducer cells, each acoustic transducer cell including a pair of electrodes; and
   a circuit adapted to apply one of a plurality of bias voltages to each pair of electrodes, wherein:
      the plurality of bias voltages include a positive bias voltage and a negative bias voltage;
      the positive bias voltage is applied as the one bias voltage to at least a first pair of electrodes; and
      the negative bias voltage is applied as the one bias voltage to at least a second pair of electrodes.

16. The acoustic transducer array of claim 15, wherein:
   each pair of electrodes includes a first electrode and a second electrode; and the circuit comprises:
- a plurality of first connection nodes, each first connection node including the first electrodes of the plurality of acoustic transducer cells of at least one acoustic transducer element;
- a plurality of second connection nodes, each second connection node including the second electrode of at least one acoustic transducer cell of each acoustic transducer element; and
- connecting circuitry adapted to couple the plurality of bias voltages between the plurality of first connection nodes and the plurality of second connection nodes.

17. The acoustic transducer array of claim 16, wherein:
the plurality of acoustic transducer elements are adjacent to each other in an azimuth direction such that consecutively numbered acoustic transducer cells of a first acoustic transducer element are aligned in an elevation direction with like consecutively numbered acoustic transducer cells of all other acoustic transducer elements; and
each second connection node includes a contiguous subset of the second electrodes of the consecutively numbered acoustic transducer cells of adjacent acoustic transducer elements.

18. The acoustic transducer array of claim 17, wherein:
the plurality of acoustic transducer elements include at least 36 acoustic transducer elements;
each acoustic transducer element has a first width in the azimuth direction of at least one-half wavelength at a frequency of interest;
each first connection node is connected to an RF channel of an ultrasound system; and
the contiguous subset has a second width in the elevation direction of at least one-quarter wavelength at the frequency of interest.

19. The acoustic transducer array of claim 16, wherein the connecting circuitry comprises at least one of:
at least one multiplexer;
at least one relay;
at least one transistor; and
hard-wiring.

20. The acoustic transducer array of claim 19, wherein the connecting circuitry comprises:
a plurality of bias voltage inputs connected to the plurality of bias voltages;
a plurality of bias voltage outputs connected to the plurality of second connection nodes; and
a selection input, the selection input connect to a designated bias voltage pattern.

21. The acoustic transducer array of claim 20, further comprising selection circuitry adapted to identify the designated bias voltage pattern.

22. The acoustic transducer array of claim 21, wherein the selection circuitry comprises:
a memory unit, the memory unit including a look-up table containing at least one bias voltage pattern; and
a means for pointing to the designated bias voltage pattern from within the look-up table.

23. The acoustic transducer array of claim 22, wherein the memory unit is an erasable, programmable, read only memory (EPROM).

24. The acoustic transducer array of claim 22, wherein:
the at least one bias voltage pattern further includes a focal zone number; and
the means for pointing includes a system generated focal zone number pointer.

25. The acoustic transducer array of claim 24, wherein the system generated focal zone number pointer is inferred from a timing of an excitation voltage applied to each of the plurality of acoustic transducer elements.

26. The acoustic transducer array of claim 15, wherein the positive bias voltage has an amplitude different than the negative bias voltage.

27. The acoustic transducer array of claim 15, wherein the plurality of bias voltages are generated discretely and separately from the acoustic transducer element.

28. The acoustic transducer array of claim 15, wherein the plurality of bias voltages are generated locally to the acoustic transducer element.

29. The acoustic transducer array of claim 15, wherein the circuit varies, as a function of time, an amplitude and a polarity for at least one bias voltage of the plurality of bias voltages.

30. The acoustic transducer array of claim 29, wherein the amplitude and the polarity are varied such that elevation focus in a range direction is different from that of a uniformly biased transducer array.

31. The acoustic transducer array of claim 29, wherein the amplitude and the polarity are varied such that a center point of a peak elevation focus in an elevation direction is off-center to the acoustic transducer array in the elevation direction.

32. A method of controlling an acoustic transducer array, the acoustic transducer array including a plurality of acoustic transducer elements, each acoustic transducer element including a plurality of acoustic transducer cells, each acoustic transducer cell including a pair of electrodes, comprising the step of:
applying one of a pluraliLy of bias voltages to each pair of electrodes, wherein:
the plurality of bias voltages include a positive bias voltage and a negative bias voltage;
the positive bias voltage is applied as the one bias voltage to at least a first pair of electrodes; and
the negative bias voltage is applied as the one bias voltage to at least a second pair of electrodes.

33. The method of claim 32, further comprising the steps of:
connecting a first electrode of each pair of electrodes of the plurality of acoustic transducer cells of at least one acoustic transducer element to form a plurality of the first connection nodes;
connecting a second electrode of each pair of electrodes of at least one acoustic transducer cell of each acoustic transducer element to form a plurality of second connection nodes, and
coupling the plurality of bias voltages between the plurality of first connection nodes and the plurality of second connection nodes.

34. The method of claim 33, further comprising the steps of:
aligning the plurality of acoustic transducer elements adjacent to each other in an azimuth direction such that consecutively numbered acoustic transducer cells of a first acoustic transducer element are aligned in an elevation direction with like consecutively numbered acoustic transducer cells of all other acoustic transducer elements; and
including in each second connection node a contiguous subset of the second electrodes of the consecutively numbered acoustic transducer cells of adjacent acoustic transducer elements.

35. The method of claim 34, wherein:
the plurality of acoustic transducer elements include at least 36 acoustic transducer elements;
each acoustic transducer element has a first width in the azimuth direction of at least one-half wavelength at a frequency of interest;
each first connection node is connocted to an RF channel of an ultrasound system; and
the contiguous subset has a second width in the elevation direction of at least one-quarter wavelength at the frequency of interest.

36. The method of claim 33, wherein the step of coupling uses a multiplexer.

37. The method of claim 33, wherein the step of coupling uses connecting circuitry comprising at least one of:
at least one multiplexer;
at least one relay;
at least one transistor; and
hard-wiring.

38. The method of claim 37, wherein using the connecting circuitry comprises:
connecting the plurality of bias voltages to a plurality of bias voltage inputs of the multiplexer;
connecting the plurality of second connection nodes to a plurality of bias voltage outputs of the multiplexer; and
connecting a designated bias voltage pattern to a selection input of the multiplexer.

39. The method of claim 38, further comprising the step of identifying the designated bias voltage pattern.

40. The method of claim 39, wherein identifying the designated bias voltage pattern comprises:
connecting a memory unit to the selection input, the memory unit including a look-up table containing at least one bias voltage pattern; and
pointing to the designated bias voltage pattern from within the look-up table.

41. The method of claim 40, wherein the memory unit is an erasable, programmable, read only memory (EPROM).

42. The method of claim 40, wherein:
the at least one bias voltage pattern further includes a focal zone number; and
pointing includes using a system generated focal zone number pointer.

43. The method of claim 42, wherein the system generated focal zone number pointer is inferred from a timing of an excitation voltage applied to each of the plurality of acoustic transducer elements.

44. The method of claim 32, wherein the positive bias voltage has an amplitude different magnitude than the negative bias voltage.

45. The method of claim 32, wherein the step of applying the plurality of bias voltages varies, as a function of time, an amplitude and a polarity for at least one of the plurality of bias voltages.

46. The method of claim 45, wherein the amplitude and the polarity are varied such that an elevation focus in a range direction is different from that of a uniformly biased acoustic transducer array.

47. The method of claim 45, wherein the amplitude and the polarity are varied such that a center point of a peak elevation focus in an elevation direction is off-center to the acoustic transducer array in the elevation direction.

* * * * *